(12) United States Patent
Tebby

(10) Patent No.: US 10,690,249 B2
(45) Date of Patent: Jun. 23, 2020

(54) ACTIVE SURFACE FOR A PACKING SEAL INTENDED FOR A SHAFT SEALING SYSTEM

(71) Applicant: AREVA NP, Courbevoie (FR)

(72) Inventor: Zoé Tebby, Haspres (FR)

(73) Assignee: AREVA NP, Courbevoie (FR)

( * ) Notice: Subject to any disclaimer, the term of this patent is extended or adjusted under 35 U.S.C. 154(b) by 95 days.

(21) Appl. No.: 14/905,347

(22) PCT Filed: Jul. 22, 2014

(86) PCT No.: PCT/EP2014/065726
§ 371 (c)(1),
(2) Date: Jan. 15, 2016

(87) PCT Pub. No.: WO2015/011141
PCT Pub. Date: Jan. 29, 2015

(65) Prior Publication Data
US 2016/0172062 A1    Jun. 16, 2016

(30) Foreign Application Priority Data

Jul. 24, 2013   (FR) ...................................... 13 57297

(51) Int. Cl.
*F16J 15/34* (2006.01)
*F04D 29/12* (2006.01)
(Continued)

(52) U.S. Cl.
CPC ........ *F16J 15/3424* (2013.01); *F04D 29/126* (2013.01); *F16J 15/34* (2013.01);
(Continued)

(58) Field of Classification Search
CPC .. F16J 15/3404; F16J 15/3408; F16J 15/3412; F16J 15/3424; F16J 15/3428;
(Continued)

(56) References Cited

U.S. PATENT DOCUMENTS 4,047,984 A * 9/1977 Belke ................. B23K 26/0072
148/565
4,323,401 A * 4/1982 Belke ........................ B23P 9/00
148/320
(Continued)

FOREIGN PATENT DOCUMENTS

JP          57161366       4/1982

OTHER PUBLICATIONS

Angloher, Preliminary Search Report for FR 1357297 dated Apr. 11, 2014.
(Continued)

*Primary Examiner* — Nicholas L Foster
(74) *Attorney, Agent, or Firm* — Greer, Burns & Crain, Ltd.

(57) ABSTRACT

A packing seal is provided for a system for sealing the shaft of a primary motor-driven pump unit of a nuclear reactor, intended to ensure sealing between the primary circuit and the atmosphere. The packing seal including a rotary active surface and a floating active surface, in which a face of the floating active surface and/or the rotary active surface is micro- or nano-structured by an array of holes or pillars, each hole or pillar having lateral dimensions and a height of between 10 nm and 5 μm, the distance between two consecutive holes or pillars being between 10 nm and 5 μm.

6 Claims, 3 Drawing Sheets

(51) Int. Cl.
*G21D 1/04* (2006.01)
*G21C 15/243* (2006.01)

(52) U.S. Cl.
CPC ............ *F16J 15/3496* (2013.01); *G21D 1/04* (2013.01); *F05D 2300/516* (2013.01); *F05D 2300/608* (2013.01); *G21C 15/243* (2013.01)

(58) Field of Classification Search
CPC ................ F16J 15/3496; F04D 29/126; F05D 2300/516; G21D 1/04
See application file for complete search history.

(56) References Cited

U.S. PATENT DOCUMENTS

| | | | | |
|---|---|---|---|---|
| 4,391,450 | A * | 7/1983 | Beck | B63H 23/321 277/306 |
| 4,573,690 | A * | 3/1986 | DeHart | F16J 15/324 277/309 |
| 4,925,490 | A * | 5/1990 | Nagai | C04B 38/0051 75/238 |
| 4,997,192 | A * | 3/1991 | Nagai | C04B 38/0051 277/400 |
| 5,057,340 | A * | 10/1991 | Iyer | C23C 24/08 376/203 |
| 5,834,094 | A * | 11/1998 | Etsion | F16C 33/14 428/156 |
| 5,952,080 | A * | 9/1999 | Etsion | F16C 33/14 428/156 |
| 6,002,100 | A * | 12/1999 | Etsion | F16C 33/14 219/121.71 |
| 6,046,430 | A * | 4/2000 | Etsion | F16C 33/14 219/121.71 |
| 6,149,160 | A * | 11/2000 | Stephens | F16C 17/026 277/399 |
| 6,280,090 | B1 * | 8/2001 | Stephens | F16C 17/026 384/278 |
| 6,341,782 | B1 * | 1/2002 | Etsion | F16J 15/3412 277/399 |
| 7,066,469 | B2 * | 6/2006 | Stephens | F16J 15/3404 277/359 |
| 8,360,436 | B2 * | 1/2013 | Teshima | F16J 15/3424 277/399 |
| 8,689,907 | B2 * | 4/2014 | Lu | E21B 10/25 175/371 |
| 8,859,078 | B2 * | 10/2014 | Maurin-Perrier | B23K 26/0084 428/141 |
| 9,228,660 | B2 * | 1/2016 | Hosoe | F16J 15/3412 |
| 9,234,594 | B2 * | 1/2016 | Inoue | F16J 15/3424 |
| 9,261,139 | B2 * | 2/2016 | McCulfor | F16J 15/16 |
| 9,371,912 | B2 * | 6/2016 | Hosoe | F16J 15/3412 |
| 9,383,017 | B2 * | 7/2016 | Young | F16J 15/3412 |
| 9,512,923 | B2 * | 12/2016 | Inoue | F16J 15/3424 |
| 9,777,820 | B2 * | 10/2017 | Ghilbert-Simon | F16H 53/06 |
| 9,829,043 | B2 * | 11/2017 | Inoue | F16J 15/3412 |
| 2002/0090155 | A1 * | 7/2002 | Ushijima | F02F 1/20 384/293 |
| 2004/0026871 | A1 * | 2/2004 | Stephens | F16J 15/3404 277/401 |
| 2008/0106041 | A1 * | 5/2008 | Shibayama | F16J 15/324 277/399 |
| 2011/0048810 | A1 * | 3/2011 | Lin | E21B 10/25 175/371 |
| 2011/0101616 | A1 * | 5/2011 | Teshima | F16J 15/3424 277/358 |
| 2012/0024608 | A1 * | 2/2012 | Lu | E21B 10/25 175/371 |
| 2012/0217705 | A1 * | 8/2012 | Hosoe | F16J 15/3412 277/400 |
| 2013/0154192 | A1 * | 6/2013 | Sitko | F16J 15/16 277/300 |
| 2014/0217676 | A1 * | 8/2014 | Hosoe | F16J 15/3412 277/350 |
| 2014/0219588 | A1 * | 8/2014 | McCulfor | F16J 15/16 384/26 |
| 2015/0042045 | A1 * | 2/2015 | Inoue | F16J 15/3424 277/431 |
| 2015/0084286 | A1 * | 3/2015 | Inoue | F16J 15/3424 277/400 |
| 2015/0097341 | A1 * | 4/2015 | Inoue | F16J 15/3424 277/400 |
| 2016/0195139 | A1 * | 7/2016 | Inoue | F16J 15/3412 384/138 |
| 2016/0230891 | A1 * | 8/2016 | Tebby | G21C 15/243 |
| 2017/0227056 | A1 * | 8/2017 | Inoue | F16C 33/74 |

OTHER PUBLICATIONS

Angloher, International Search Report for PCT/EP2014/065726 dated Nov. 6, 2014.

Lefevre et al, Deposition of hematite particles on alumina seal faceplates of nuclear reactor coolant pumps—laboratory experiments and industrial feedback, Hem. Ind. 2012, v 66, n 3, p. 291-299.

Besbes et al, "Surface characterisation and functionalisation of indium tin oxide (ITO) electrodes for polymer-based light-emitting devices," Materials, 2002, p. 1-4.

* cited by examiner

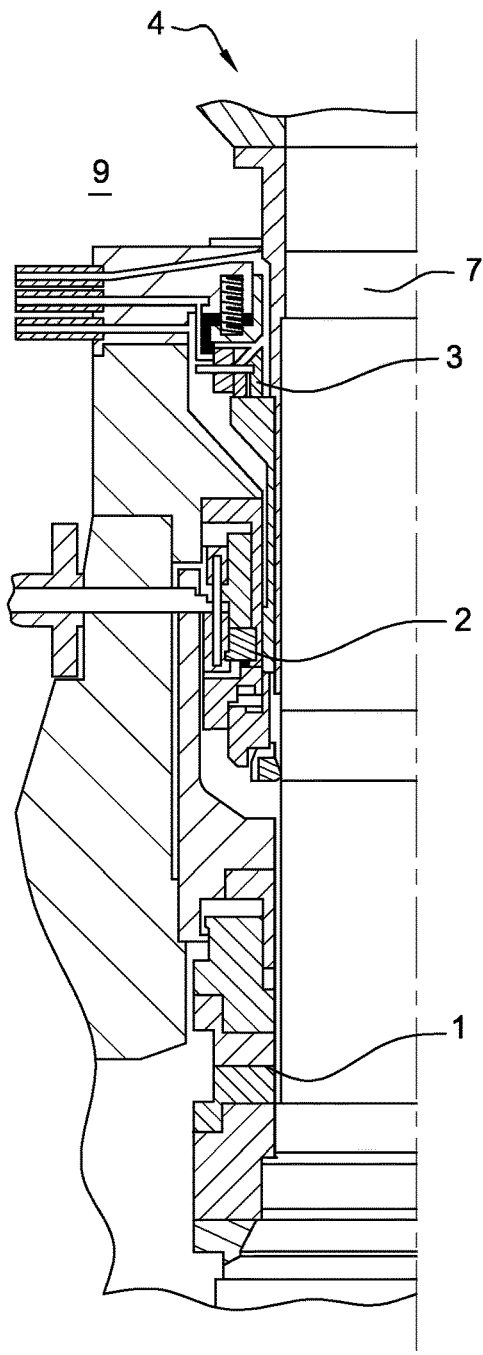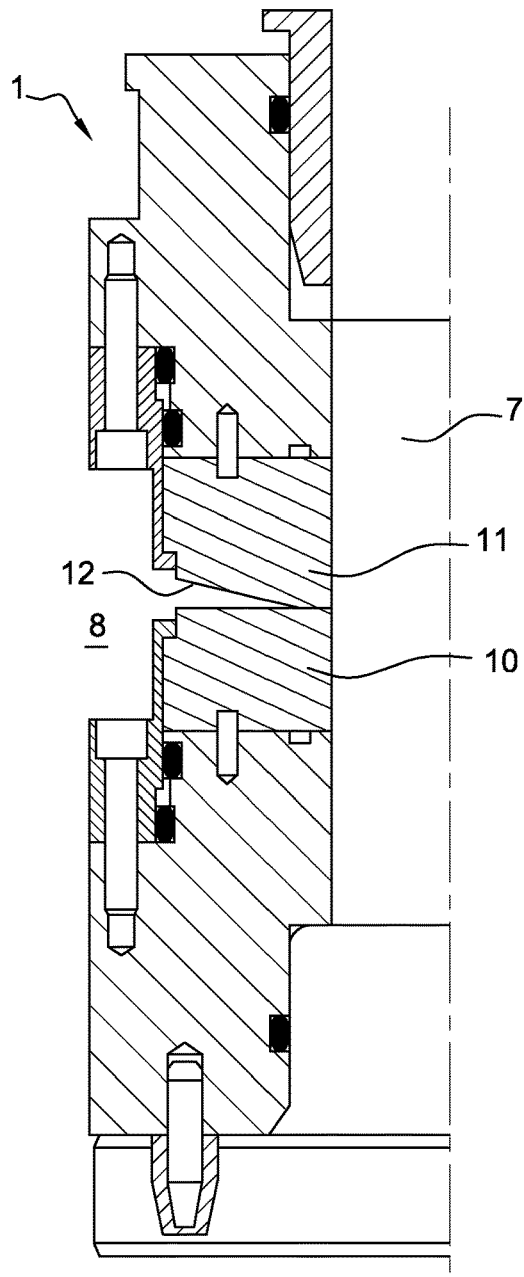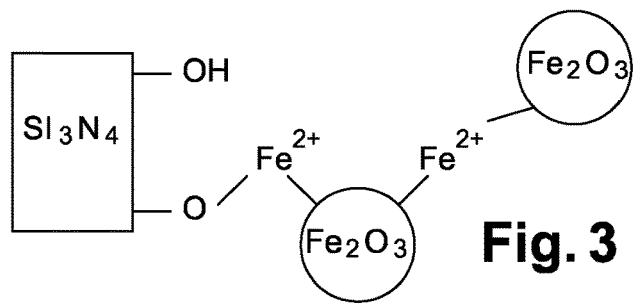
Fig. 1　　　Fig. 2
Fig. 3

ACTIVE SURFACE FOR A PACKING SEAL INTENDED FOR A SHAFT SEALING SYSTEM

BACKGROUND

The field of the invention is that of primary motor-driven pump units for pressurised water nuclear reactors (PWR). More precisely, this invention relates to ices, also referred to as active surfaces, of the main mechanical packing seal of the primary motor-driven pump unit.

In nuclear reactors, the primary pump generates the circulation of water in the primary circuit of pressurised water nuclear reactors. A dynamic system for sealing the shaft provides the seal between the primary circuit and the atmosphere. This system for sealing the shaft is a system with controlled leakage. It comprises three seals arranged in series. Each seal comprises two active surfaces that provide the main seal. One of the active surfaces, called rotary active surface, is mounted in a rotating unit integral with the shaft, the other active surface, referred to as floating, is mounted in a unit that does not rotate but that is free to be displaced axially in order to follow the possible axial displacements of the shaft.

The seal no. 1 provides most of the drop in pressure between the primary circuit and the atmosphere. It is of the hydrostatic type, with a film of water of a thickness of about 10 μm. The particular geometry of the surfaces of the active surfaces that provide the main seal makes it possible, when stopped as well as when rotating, the automatic adjustment of their separation which depends only on the ΔP of the seal. The active surfaces were initially made of alumina, but they are increasingly made of silicon nitride, which is more resistant to friction.

The seal 1 operates with a controlled leakage rate, of about 600 l/h during operation, thanks to the specific profile machines on its active surfaces. It makes it possible to pass from a pressure of 155 bars to a pressure of about 2 bars.

However, in the seals no. 1 of prior art, it was observed that a substantial deposit of iron oxide clogs the active surfaces and modifies the slope of these surfaces, which leads to a modification in the leakage rate.

The document "Deposition of hematite particles on alumina seal faceplates of nuclear reactor coolant pumps-laboratory experiments and industrial feedback" by Gregory Lefvre, Ljiljana S. Zivkovic and Anne Jaubertie, Hem. Ind., 2012, explains that this phenomenon of clogging is due to a phenomenon in two steps:

- The particles are transported from the solution to the active surfaces by hydrodynamic, electrophoretic and thermophoretic phenomena;
- Then they adhere to the sealing surfaces via physical-chemical interactions. In prior art, these interactions are considered as being substantially due to the fact that the particles of hematite are positively charged, while the surfaces of the active surfaces are negatively charged.

In order to overcome this problem, document U.S. Pat. No. 7,287,756 proposes to add a catalyst to the surface of the active surfaces. This catalyst is more preferably one of or a mixture of the following compounds: rhenium, ruthenium, rhodium, palladium, silver, osmium, iridium, platinum, gold. According to document U.S. Pat. No. 7,287,756, the iron is present in solution in the form of FeOOH (goethite) and $Fe^{2+}$ ions. The goethite would be deposited on the surface of the packing seals. In parallel, the $Fe^{2+}$ ions would be oxidised by the oxygen into $Fe^{3+}$ ions which would precipitate and consolidate the deposit. The deposit would then develop into hematite ($Fe_2O_3$). The use of catalysts would make it possible to dissociate the hydrogen present, with as a consequence reducing the chemical potential, preventing the oxidation of the ions $Fe^{2+}$ and reducing the $Fe^{3+}$ ions present in $Fe^{2+}$, therefore preventing the depositing of the oxide from taking place.

The applicant has identified another mechanism for forming the deposit of oxide on the surfaces of the active surfaces. We therefore propose a solution that takes this mechanism of forming into account.

The invention aims to overcome the disadvantages of prior art by proposing an effective solution for preventing the clogging of the active surfaces of the seal no. 1 of the system for sealing the shaft of the primary motor-driven pump unit of a nuclear reactor.

To do this, the invention proposes to structure the surface of the active surfaces in such a way as to create asperities on the surface of the active surfaces that are smaller than the particles which are likely to attach to the surface of the active surfaces in order to form the clogging. The structuring aims to limit the points of attaching in such a way as to prevent these particles from being fixed on the surface of the active surfaces.

More precisely, the invention proposes an active surface for a packing seal for a system for sealing the shaft of primary motor-driven pump units of nuclear reactors, intended to provide the seal between the primary circuit and the atmosphere, with the active surface having at least one surface structured by an array of asperities, with each asperity having lateral dimensions between 10 nm and 5 μm, with each asperity having a height between 10 nm and 5 μm, with the distance between two consecutive asperities being between 10 nm and 5 μm.

Structuring the surface of the active surface in such a way as to have asperities that have such dimensions makes it possible to have on the surface of the active surface asperities that are smaller than the particles of $Fe_2O_3$, and therefore to reduce the points of attaching of these particles. Indeed, contrary to the phenomenon of attaching described in the documents of prior art, our experiments have shown that the particles of hematite do not directly attach to the surface of the active surfaces, but they attach to the $Fe^{2+}$ ions which are themselves absorbed at the surface of the active surfaces. Indeed, the $Fe^{2+}$ ions are attracted by the negative surface and donor of electrons of the active surfaces. The $Fe^{2+}$ is a Lewis acid, it reacts with the oxygen groups present on the surface of the active surfaces and can in turn react with the colloidal or particulate $Fe_2O_3$ which has a strong electron donor component. The $Fe^{2+}$ ions can then be absorbed on the surface of the particles of hematite and the continuous chain reaction, which causes the clogging of the active surfaces. Consequently, in order to prevent this clogging, the applicant proposes to prevent the attaching of the particles of $Fe_2O_3$ to the $Fe^{2+}$ on the surface of the active surfaces.

The active surface according to the invention can also have one or several of the characteristics hereinafter taken individually or in any technically permissible combination.

The asperities can be holes or pillars.

When the asperities are holes, the height of the hole is called its depth. When the asperities are pillars, the form factor of the pillar, which corresponds to the ratio of its height over its lateral dimension must be more preferably less than 2 in order to prevent erosion phenomena.

The active surface according to the invention can be a rotary active surface or a floating active surface of the packing seal.

Advantageously, the entire surface of the active surface that is intended to be in contact with the film of water is structured.

The asperities can be nanometric asperities. In this case, the asperities have more preferably lateral dimensions between 10 nm and 1 µm, and a height between 10 nm to 1 µm. The distance between two consecutive asperities is preferably between 10 nm and 1 µm.

Indeed, the particles able to be attached to the $Fe^{2+}$ on the surface of the active surfaces generally have dimensions between 50 nm and 5 µm, and it is preferable to have asperities that have dimensions between 10 and 50%, and more preferably of about from 20 to 30%, of the size of the particles of $Fe_2O_3$ in such a way as to prevent as much as possible the attaching of the particles of $Fe_2O_3$ on the surface of the active surface.

The asperities can also be micronic asperities. In this case, the asperities more preferably have lateral dimensions between 1 µm and 5 µm, and a height between 1 µm and 5 µm. The distance between two consecutive asperities is preferably between 1 µm and 5 µm.

The array of asperities is more preferably regular, i.e. it comprises a pattern that can be regularly reproduced, which facilitates the control of the array of asperities.

According to an embodiment, the asperities have more preferably the same dimensions and the distance between two consecutive asperities is preferably always the same, which facilitates the manufacture of the array of asperities.

According to a preferred embodiment, the surface of the active surface is micro- and nanostructured hierarchically by an array of micronic asperities of a lateral dimension and of a height between 500 nm and 5 µm, and preferably between 1 µm and 2 µm, with the distance between two micronic asperities being between 500 nm and 5 µm, and preferably between 1 µm and 2 µm. These micronic asperities are structured by nanometric asperities of lateral dimensions and of a height between 10 nm and 200 nm, and preferably between 50 nm and 100 nm. The distance between two adjacent nanometric asperities is between 10 nm and 200 nm. This double structuring at the nanometric and micrometric scale makes it possible to further reduce the attaching of the particles that can form the deposit.

The nanometric asperities can be holes or pillars.

The micronic asperities can be holes or pillars.

The active surfaces of the seal are more preferably made of silicon nitride.

Another aspect of the invention also relates to a method of protection against the clogging of the active surfaces of the packing seal for a system for sealing the shaft of primary motor-driven pumps of nuclear reactors, comprising a step of structuring the surface of the active surface in such a way as to carry out an array of asperities on the surface of the active surface. With each asperity having lateral dimensions between 10 nm and 5 µm, and a height between 10 nm and 5 µm, the distance between two consecutive asperities is between 10 nm and 5 µm.

The asperities can be holes or pillars.

When the asperities are pillars, they more preferable have a form factor less than 2 in order to prevent erosion phenomena.

According to different embodiments, this step of nanostructuring or microstructuring can be carried out according to:

A top-down approach by micro- or nanolithography, electron-beam lithography, X-ray lithography, deep ultraviolet lithography, nanoimprint lithography, interference lithography, via focused ion beam, laser scribing or via scanning probe microscopy. These steps can comprise a step of dry or wet etching.

A bottom-up approach (nanosphere or colloidal lithography) during which a mask of micro- or nano-objects (balls, nanoparticles, self-assembled block copolymers) can be used to replicate the asperities in the substrate via wet, dry or laser etching.

The method can also comprise one or several of the following steps:

A step of reducing the sizes of the micro- or nano-objects a step of depositing a layer serving as a mask on the micro- or nano-objects and on the non-covered substrate between the micro- or nano-objects a step of removing micro- or nano-objects, leaving the mask on the substrate and forming an array of holes in the mask formed by the imprint of the micro- or nano-objects a step of etching through the imprint of the nano-objects and the removing of the mask.

The method can also comprise a step of depositing a protective layer against the clogging on the surface of the active surface. This protective layer is more preferably made of SiC, TiN, CrN, Ni or micro- or nanocrystalline diamond. In this case, it is more preferably the surface of the protective layer that is micro- or nanostructured.

BRIEF DESCRIPTION OF THE DRAWINGS

Other characteristics and advantages of the invention will result from reading the following detailed description, in reference to the annexed figures, which show:

FIG. 1, a cross-section view of a system for sealing a shaft according to an embodiment of the invention;

FIG. 2, a diagrammatical view of a seal no. 1 according to an embodiment of the invention;

FIG. 3 diagrammatically shows the phenomenon of clogging of a seal of an active surface;

For increased clarity, identical or similar elements are marked with identical reference signs over all of the figures.

DETAILED DESCRIPTION

Figure 4:
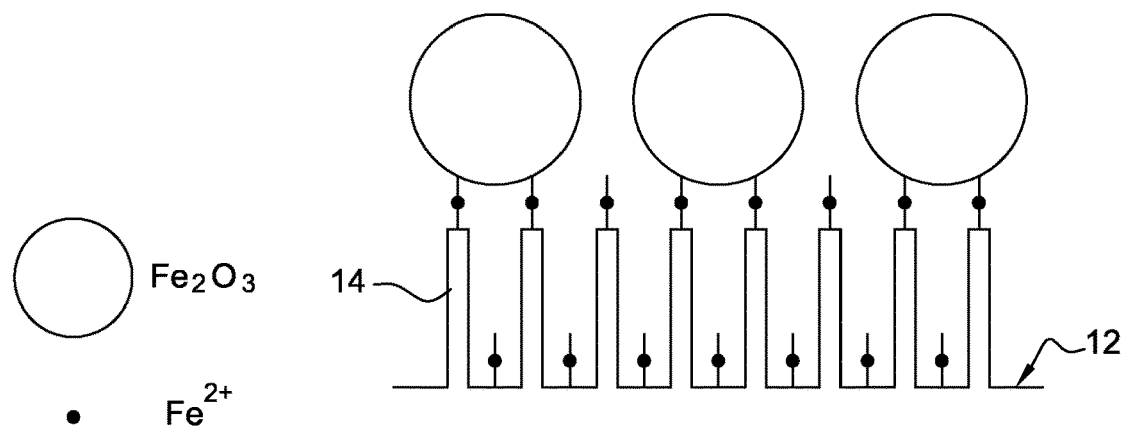
FIG. 4 diagrammatically shows the attaching of particles on the surface of a seal of an active surface according to an embodiment of the invention and on a flat surface of an active surface.
Figure 4:
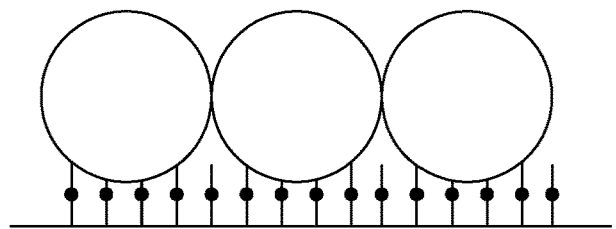

FIG. 1 shows a system of mechanical packing seals for the shaft 4 of a primary motor-driven pump unit of a nuclear reactor. This system for sealing the shaft comprises a seal no. 1 referenced as 1 in the figure, a seal no. 2 referenced as 2 in the figure, a seal no. 3 referenced as 3 in the figure. Each seal 1, 2, 3 is comprised of a rotary active surface integral with the shaft 7 and with a floating active surface that can follow the axial displacements of the shaft 7 but not rotating.

The seal no. 1 is shown more precisely in FIG. 2. The seal no. 1 provides most of the drop in pressure between the primary circuit 8 and the atmosphere 9. The seal no. 1 is of the hydrostatic type, with a film of water of a thickness of about 10 µm. The seal no. 1 comprises a rotary active surface 10 integral with the shaft 7 and a floating active surface 11 that can follow the axial displacements of the shaft 7. The leakage rate of the seal no. 1 is determined by the double slope of the floating active surface 11 or by the slopes of the rotating 10 and floating 11 active surfaces. The active surfaces are made of silicon nitride Si3N4.

The process of clogging of the active surfaces 10, 11 in the absence of the characteristics of the invention is explained in FIG. 3. Water circulates between the active surfaces 10, 11. This water provides $Fe^{2+}$ ions which are preferentially adsorbed at the surface of the active surfaces in $Si_3N_4$. The $Fe^{2+}$ is a Lewis acid, it reacts with the oxygen groups present on the surface of the active surfaces and can in turn react with the colloidal or particulate $Fe_2O_3$ that has a strong electron donor component. The $Fe^{2+}$ ions can then be absorbed on the surface of the particles of hematite and the continuous chain reaction, which causes the clogging of the active surfaces.

In order to prevent this clogging process, in reference to FIG. 4, the surface 12 of each one of the active surfaces 10, 11 is structured in such a way as to avoid asperities 14 on the surface of the active surfaces that have a size between 10% and 50% of the size of the particles of $Fe_2O_3$. Consequently, the surface of the active surfaces is structured by an array of asperities 14, which can be holes or pillars.

When the asperities 14 are holes, each hole has lateral dimensions between 10 nm and 5 µm, and a height from 10 nm to 5 µm, with the distance between two consecutive holes being between 10 nm and 5 µm.

When the asperities are pillars, each pillar has lateral dimensions between 10 nm and 5 µm and a height between 10 nm to 5 µm. The form factor, i.e. the ratio of the height over the lateral dimension is more preferably less than 2 in order to prevent erosion phenomena. The distance between two consecutive pillars is between 10 nm and 5 µm.

As such, even if $Fe^{2+}$ ions are adsorbed on the surface of the active surfaces, the attaching of the particles of $Fe_2O_3$ on the surface of the active surfaces is then limited by the surface roughness of the active surfaces with respect to a flat surface, as such preventing the clogging of the active surfaces.

The structuring of the surface of the active surfaces can be carried out by different methods.

According to an embodiment, the structuring is a nano-structuring that can be carried out according to a bottom-up approach, for example by using a method of nanosphere lithography.

Figure 5:
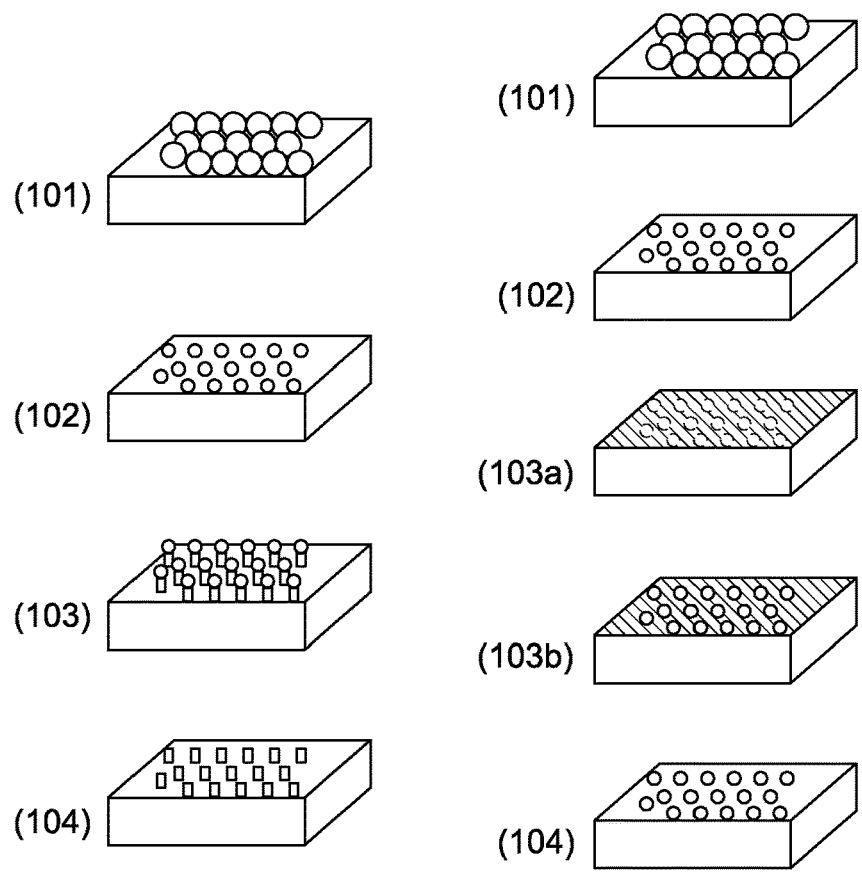
FIG. 5 diagrammatically shows two methods according to an embodiment of the invention.

As such, FIG. 5 shows a nanosphere lithography (NSL) method that makes it possible to obtain an array of holes or of pillars on the surface of the active surfaces. Nanosphere lithography is based on the self-assembly of monodispersed micro- or nanospheres (polystyrene for example) on the surface of a substrate in order to form a two-dimensional mask. The method first comprises a step 101 of depositing microspheres or nanospheres on the surface of the active surface. The methods for depositing the suspension of spheres are varied: mention can be made in particular of spin-coating, the Langmuir-Blodgett method or dip-coating. The method then comprises a step 102 of reducing the size of the spheres by reactive ion etching.

When the asperities to be made are pillars, the method then comprises a step 103 of etching the surface of the active surfaces through the mask formed by the spheres in such a way as to carry out an array of pillars on the surface of each one of the active surfaces. The method then comprises a step 104 of suppressing balls.

When the asperities to be made are holes, the method comprises a step 103a of depositing a layer of chromium for example over the array of balls of a reduced size. The method then comprises a step 103b of suppressing balls. The method then comprises a step of etching through the imprint of the balls (not shown). Finally the method comprises a step 104 of suppressing the chromium mask in such a way as to former an array of holes.

Figure 6:
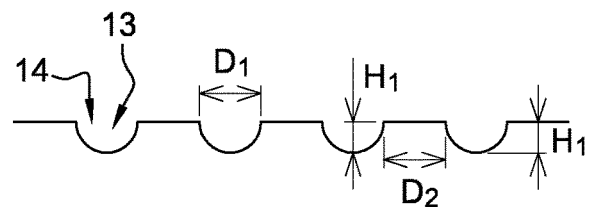
FIG. 6 diagrammatically shows the surface of an active surface according to an embodiment of the invention.

FIG. 6 diagrammatically shows an array of asperities 14 on the surface of one of the active surfaces according to an embodiment of the invention. In this embodiment, the asperities are holes 13. The holes 13 have lateral dimensions D1 between 10 nm and 5 µm. The holes 13 have a height H1 between 10 nm and 5 µm. Two adjacent holes 13 are spaced apart by a distance D2 between 10 nm and 5 µm.

Figure 7:
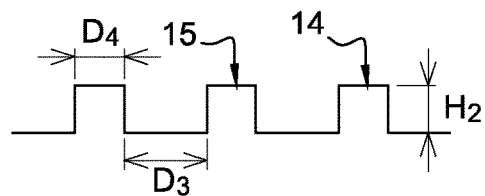
FIG. 7 diagrammatically shows the surface of an active surface according to another embodiment of the invention.

FIG. 7 diagrammatically shows an array of asperities on the surface of one of the active surfaces of another embodiment of the invention. In this embodiment, the asperities 14 are pillars 15. The pillars 15 have a lateral dimension D4 between 10 nm and 5 µm. The pillars 15 have a height H2 between 10 nm and 5 µm. Two adjacent pillars 15 are spaced by a distance D3 between 10 nm and 5 µm. The height H2 of these pillars is preferably limited to ratios H2/D4 less than 2 in order to prevent erosion phenomena.

Figure 8:
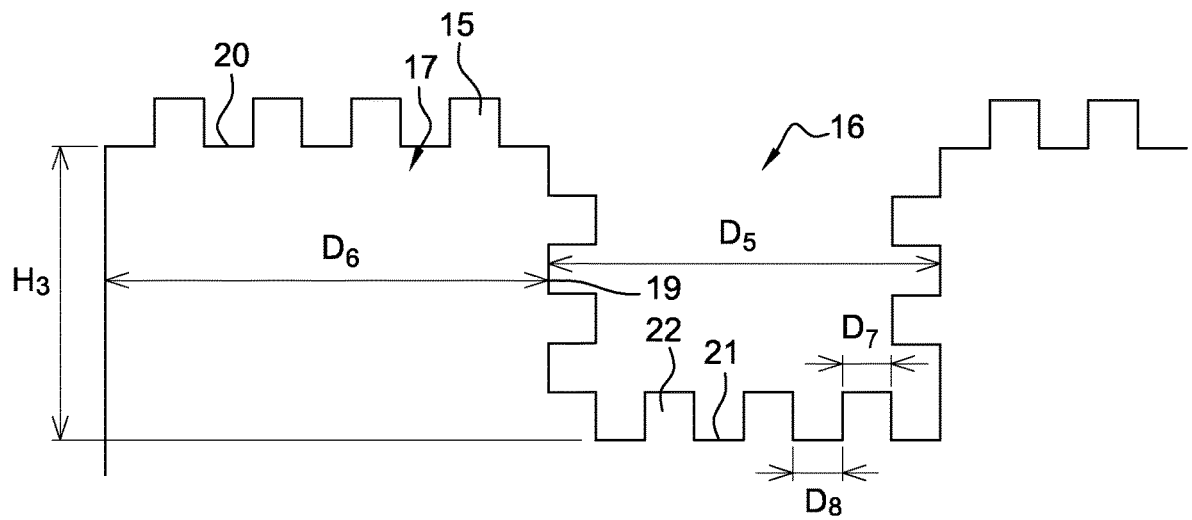
FIG. 8 diagrammatically shows an active surface according to another embodiment of the invention.

FIG. 8 diagrammatically shows the surface of an active surface according to another embodiment of the invention. In this embodiment, the surface of each one of the active surfaces has a double structuring: as such, the surface of each one of the active surfaces is micro-structured by an array of micronic asperities. In this embodiment, the micronic asperities are pillars 17. The pillars 17 have lateral dimensions D6 between 500 nm and 5 µm. The pillars 17 have a height H3 between 500 nm and 5 µm. The pillars 17 are separated by spaces 16 which have transverse dimensions D5 between 500 nm and 5 µm. Moreover, the pillars 17 preferably have a ratio of the height H3 over transverse dimensions 06 less than 2 and more preferably less than 1 in order to limit the problems of erosion. The surface of the active surfaces can for example by microstructured by a method of lithography.

The surface of the active surfaces is furthermore nano-structured by an array of nanometric asperities 22. In this embodiment, the nanometric asperities 22 are pillars similar to those described in reference to FIG. 7. The nanostructured surface is present at the bottom 21 of the spaces between pillars 17, at the upper surface 20 of the pillars 17 and more preferably also on the blanks 19 of the pillars 17. Such a nanostructuring of the upper surfaces 20, of the bottom 21 and of the blanks 19 of the pillars can be carried out by covering the surface of the microstructured active surface with nanoparticles formed by cathode sputtering. The surface of the active surface must be inclined and rotating in order to be able to deposit particles on the blanks 19 of the pillars 17. The surface of the active surface will then be etched by high pressure reactive ions in order to carry out an isotropic etching. The nanoparticles positioned on the pillars are then removed.

Naturally the invention is not limited to the embodiments described in reference to the figures and alternatives could be considered without leaving the scope of the invention. The method used to carry out the micro- or nanostructured array of holes or of pillars can be a method other than the one described in reference to FIG. 5, such as for example a top-down approach such as electron-beam lithography, X-ray lithography, focused ion beam lithography, nanoimprint lithography, interference lithography. The array of micronic or nanometric holes or of pillars can also be carried out according to a bottom-up approach, for example by using a mask of micro- or nano-objects, organised or not in such a way as to implement a method of nanosphere lithography or a method of colloidal lithography, or a method of lithography by using an assembly of block copolymers, in such a way as to transfer the patterns into the surface of the active surface, for example via wet, dry or laser etching. In particular, the laser can be focused through balls of $SiO_2$, which creates a hole in the surface of the active surface at the location of the ball. Moreover, the method of carrying out the array of holes or of pillars can also comprise additional steps such as the depositing of another layer on top of the balls, the removing of the balls and the etching through their imprint.

Moreover, the surface of the active surfaces can also be coated with a protective layer that makes it possible to prevent the $Fe^{2+}$ ions from being adsorbed on the surface of the active surfaces. In this case, the surface of the active surfaces is preferably coated with the protective layer prior to the step of micro- or nanostructuring. The protective layer is more preferably made from silicon carbide (SiC), titanium nitride (TiN), chromium nitride (CrN), nickel (Ni) or micro- or nanocrystalline diamond.

The invention claimed is:

1. A hydrostatic packing seal for a system for sealing a shaft of primary motor-driven pump units of nuclear reactors, the hydrostatic packing seal comprising:
a rotary active surface attached to the shaft and a floating active surface, wherein the floating active surface is configured to move axially to follow axial displacements of the shaft, and wherein the rotary active surface and the floating active surface face each other and are separated by a water film,
wherein said rotary active surface or said floating active surface has at least one surface structured by an array of asperities to prevent the deposition of iron oxide fouling said at least one surface of said rotary active surface or said floating active surface, each asperity having lateral dimensions between 10 nm and 5 µm, a height between 10 nm and 5 µm, and a distance between two consecutive asperities being between 10 nm and 5 µm, said asperities being holes or pillars.

2. The hydrostatic packing seal according to claim 1, wherein the asperities are holes.

3. The hydrostatic packing seal according to claim 1, wherein the asperities are pillars.

4. The hydrostatic packing seal as claimed in claim 3, wherein at least one of the pillars has a form factor less than 2.

5. The hydrostatic packing seal according to claim 1, wherein the asperities are nanometric asperities that have lateral dimensions between 10 nm and 1 µm and a height between 10 nm and 1 µm, with the distance between two consecutive asperities being between 10 nm and 1 µm.

6. The hydrostatic packing seal according to claim 1, wherein the asperities are micronic asperities that have lateral dimensions between 1 µm and 5 µm and a height between 1 µm and 5 µm, with the distance between two consecutive asperities being between 1 µm and 5 µm.

* * * * *